June 19, 1962 — A. I. APPLETON — 3,040,139
TAKE-UP REEL
Filed June 16, 1958 — 5 Sheets-Sheet 1

INVENTOR
ARTHUR I. APPLETON
by: Carlson, Pitzner, Hubbard & Wolfe
ATTYS.

June 19, 1962 A. I. APPLETON 3,040,139
TAKE-UP REEL

Filed June 16, 1958 5 Sheets-Sheet 2

INVENTOR
ARTHUR I. APPLETON
by:
Carlson, Pitzner, Hubbard & Wolfe
ATTYS.

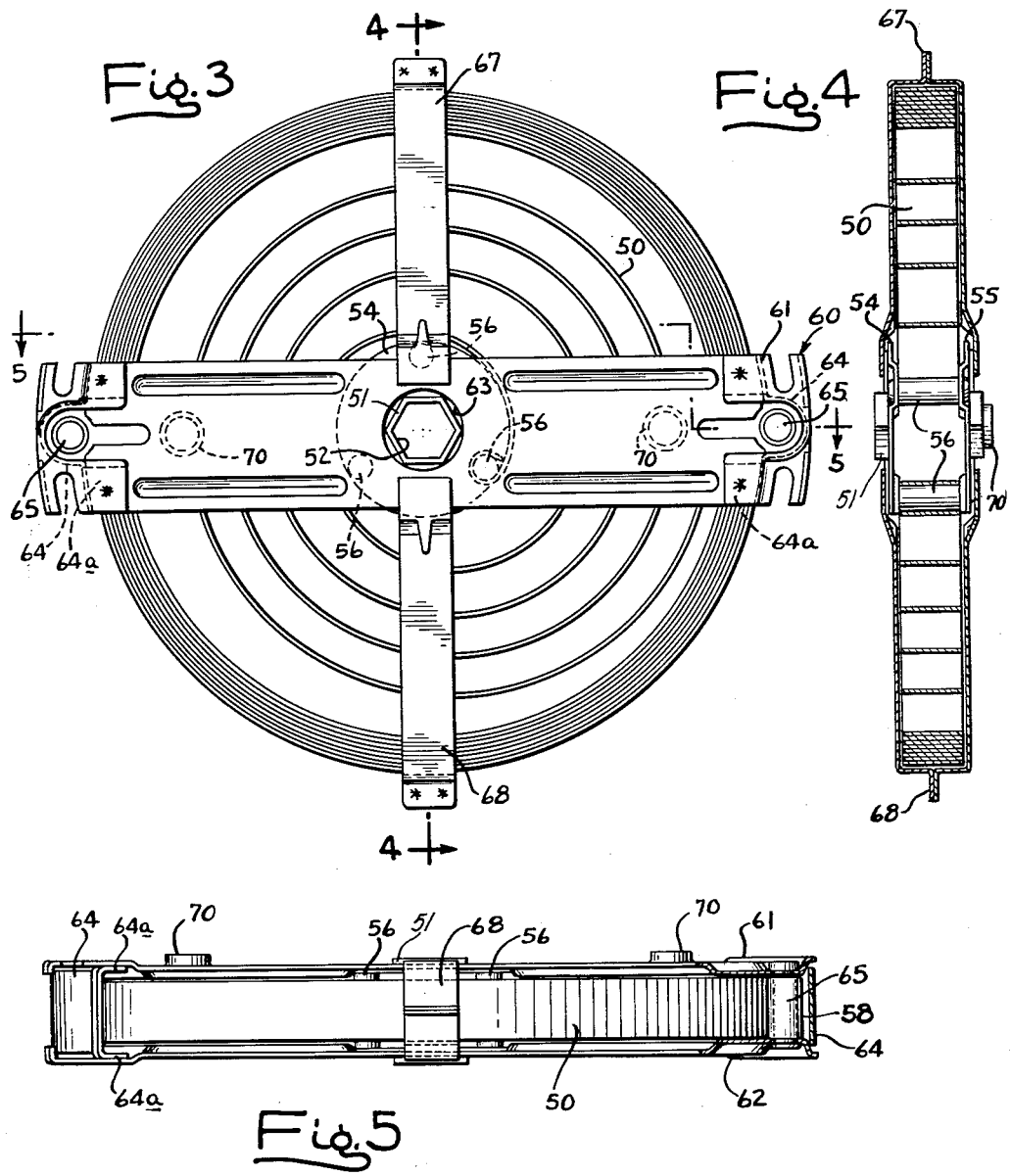

INVENTOR
ARTHUR I. APPLETON

June 19, 1962  A. I. APPLETON  3,040,139
TAKE-UP REEL
Filed June 16, 1958  5 Sheets-Sheet 5
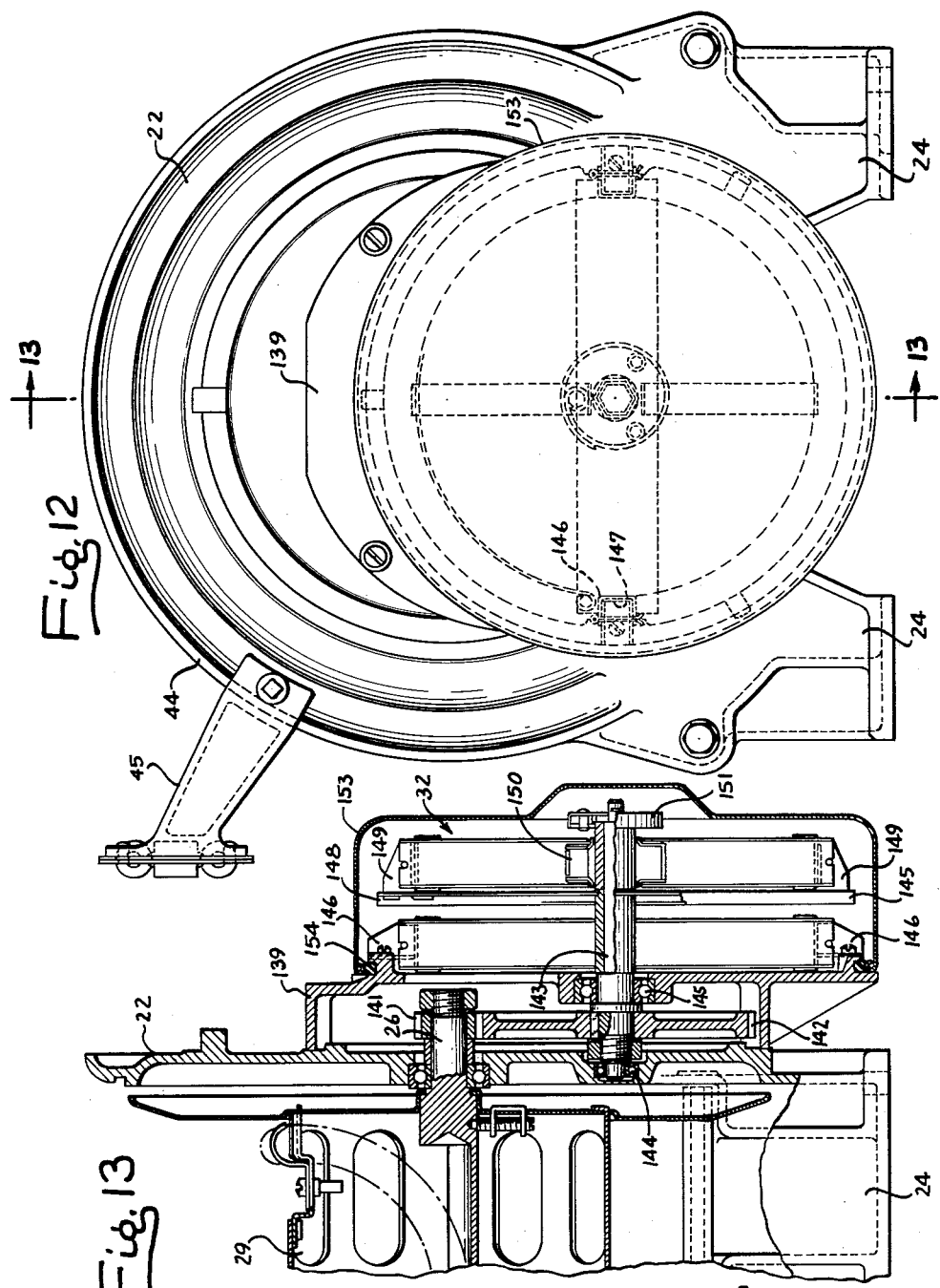
INVENTOR
ARTHUR I. APPLETON
ATTYS.

United States Patent Office 3,040,139
Patented June 19, 1962

3,040,139
TAKE-UP REEL
Arthur I. Appleton, Northbrook, Ill. (% Appleton Electric Co., 1713 Wellington Ave., Chicago 13, Ill.)
Filed June 16, 1958, Ser. No. 742,286
9 Claims. (Cl. 191—12.2)

The present invention relates to take-up reels for carrying utility cables and conduits such as electrical cables, extension cords, grounding cables, flexible hose and the like, which automatically wind or pay out these cables to machines moving to and from the utility source.

The general object of the present invention is to provide an improved take-up reel for electrical cables and the like which is adaptable for use with cables of widely differing lengths, weights, and sizes and can be expanded to accommodate cables having a number of conductors, yet which is strong and rugged and thus suitable for use in industrial surroundings as well as of simple construction making it economical to manufacture and service.

It has been common practice in the construction of take-up reels to mount coil spring motors internally of the reel on which the cable is wound. These motors must be mounted and secured in place before the reel is assembled into the frame and, accordingly, when it becomes necessary to service the motor, the cable on the reel must be unwound and the reel completely dismounted. In some instances it has been known to mount a coil spring motor and a standby motor side-by-side within the reel so that the standby motor is available in the event the main motor ceases to operate or is broken.

With the foregoing in mind, it is another object of the present invention to provide an improved spring motor construction which is mounted outboard of the frame and reel, which is easily and quickly removed to facilitate replacement and repair, and which can be serially expanded by addition of separate motor units for increasing the cable length capacity of the reel, all without interfering with the reel mounting in the frame. A more detailed object is to construct a spring motor for a take-up reel of the above character in the form of individual units which can be easily mounted on or removed from the reel shaft.

It is still another object of the present invention to provide a take-up reel of the above type having an improved collector ring and brush mounting which facilitates changes to cables of different sizes and numbers of conductors without dismantling the reel and spring motors. More specifically, it is an object of the present invention to provide an improved collector ring and brush assembly mounted outboard of the frame and reel on the opposite side thereof from the spring motor and with the collector rings mounted on a hollow extension of the reel shaft so that the end of the cable passes from the center of the reel through the shaft to the collector unit.

A related object of the present invention is to provide a take-up reel of the above type which is easily assembled or disassembled, and which incorporates an improved structure for mounting the reel, the collector ring unit, and the motor unit together as a unified take-up reel device.

A further object of the present invention is to provide a take-up reel of the foregoing character which is eminently suitable for use in explosive atmospheres where a spark or flame caused by the operation of the collector ring assembly would be dangerous. More specifically, because explosive gases tend to filter into enclosed chambers, conduits and the like despite all precautions against it, it is an object to protect against explosions when the reel is used in an explosive atmosphere by isolating the collector ring and brush assemblies within an explosion proof housing so that any spark or flame will be confined and extinguished. It is a more detailed object to isolate the collector rings and brushes within a heavy walled chamber capable of sustaining high pressures caused by internal explosion and of confining any sparks, flames or explosions thereby preventing a general explosion in the atmosphere surrounding the reel. Along this line, it is an object to enclose the collector rings and brushes mounted outboard of a reel frame within an outer heavy walled cap threaded on the frame, and isolate the end of a hollow shaft extending from the frame and through which the cable end passes also by means of a heavy walled cap threaded on a terminal block which is in turn threaded on the shaft, and further provide an explosion proof bearing surface between the shaft and the frame.

Other objects and advantages will become apparent as the following description proceeds taken in connection with the accompanying drawings wherein:

FIG. 3 is an enlarged elevation view of a spring cartridge for use as a motor in the take-up reel shown in FIG. 1.

FIG. 4 is a section view taken substantially in the plane of line 4—4 of FIG. 3.

FIG. 5 is a view of the cartridge taken substantially in the plane of line 5—5 of FIG. 3.

FIG. 12 is an end view of another modified form of take-up reel illustrating a gear drive and showing an alternative mounting for the spring cartridge.

FIG. 13 is a section view taken substantially in the plane of line 13—13 of FIG. 12.

Figure 1:
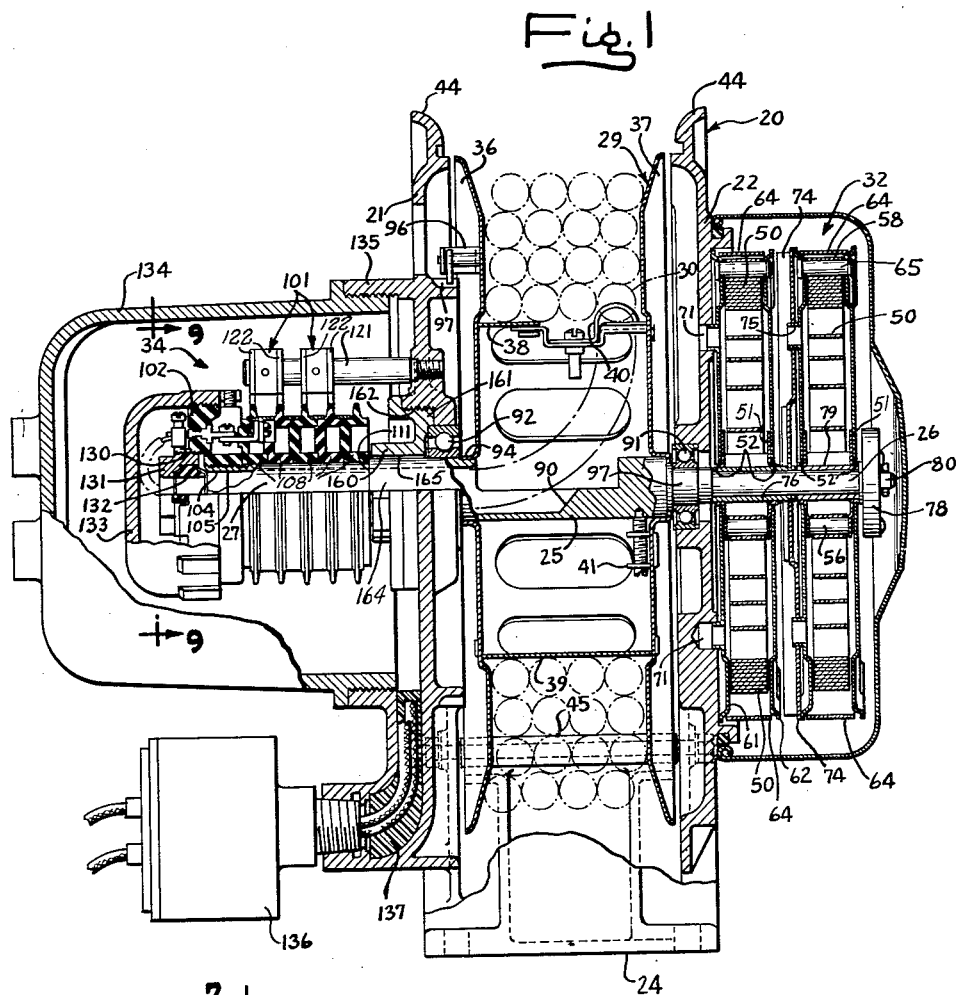
FIGURE 1 is an elevation view, partly in section, of an explosion proof direct drive take-up reel embodying the present invention.

Although certain illustrative forms of take-up reels embodying the present invention have been shown in the drawings and will be described below in considerable detail, it sould be understood that there is no intention to limit the invention to the specific forms disclosed. On the contrary, the intention is to cover all modifications, alternative constructions, equivalents and uses falling within the spirit and scope of the invention as expressed in the appended claims.

Referring to the drawings there is shown in FIG. 1 an illustrative explosion proof take-up reel comprising a rigid unitary U-shaped frame 20 desirably of cast metal construction having a pair of generally circular side panels 21, 22 fixed to a transverse mounting bracket 24. A shaft having a central portion 25 and end portions 26, 27 is journaled between the panels with the end portions 26, 27 extending to the right and to the left respectively outboard of the frame. In order to facilitate assembly of the shaft in the frame panels, the shaft portions are progressively stepped from a large diameter end portion 27 to an intermediate diameter central portion 25 to a small diameter end portion 26. Fixed on the intermediate diameter central portion of the shaft and mounted between the panels 21, 22 is a winding drum or reel 29 for carrying a cable or the like. The stepped diameter of the shaft thus permits the shaft to be inserted from one side of the frame through the first panel 21, the drum 29, and then the second panel 22.

Figure 2:
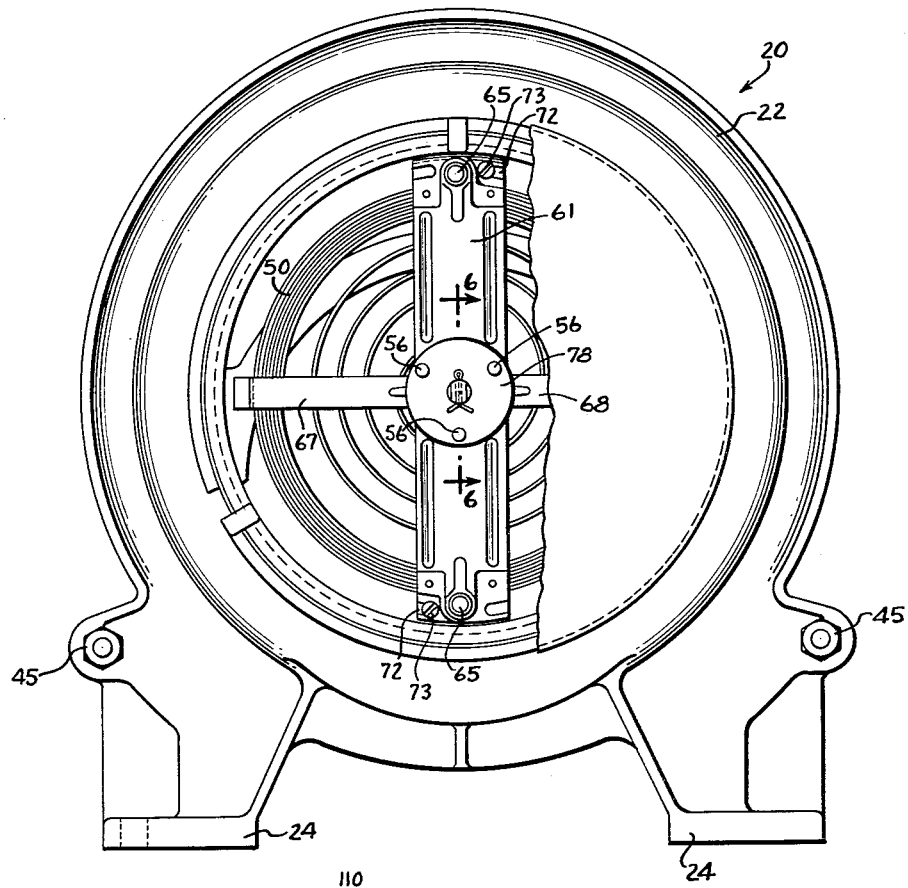
FIG. 2 is an end view, partly in section, of the take-up reel shown in FIG. 1, taken from the motor end thereof.

For purposes of rewinding a cable which has been paid out from the reel, there, is mounted on the external surface of the right hand panel 22, as shown in FIGS. 1 and 2, a spring motor designated generally as 32. This motor is fixed between the shaft extension 26 and the panel 22 so that the motor 32 is wound as the cable is pulled off of the reel. Then, as the cable is released, the wound motor rotates the shaft and reel to rewind the cable.

For electrically connecting the cable on the reel to a power or utility supply, there is provided on the left hand panel 21 a collector ring assembly 34. On the collector ring are provided slip ring and brush assemblies, one for each conductor in the wound cable. The collector ring assembly can be expanded by the addition of slip rings and brushes to accommodate cables having a greater or lesser number of conductors as will be described in greater detail hereinafter.

The winding drum 29 comprises a pair of spaced circular plates 36 and 37 fixed to and held in spaced apart relation by a pair of central drum sections 38, 39. One of the drum sections 38 includes appropriate means for receiving a cable clamp 40 (FIG. 1). For fixing the reel 29 to the shaft 25, there is provided one one of the drum sections a suitable bracket 41 having tap holes therein for receiving a set screw 42 adapted to engage the shaft 25. For guiding the cable, as it is wound onto the reel, the edges of the plates 36, 37 are desirably flared outwardly.

In order to increase the freedom of movement of the cable, a substantial portion of the drum and frame circumference is unobstructed. The cable can thus be drawn from the drum and across the edges of the frame over a large arc and in both directions. So as to prevent the wearing and fraying of the cable insulating covering as the cable is pulled over the frame edges, these edges are formed with a rounded or beaded portion 44. In addition to employing the beaded edges of the frame as a cable guide, a pair of spaced rollers 45 fixed between the panels of the frame also serve as guides and prevent the cable from coming in contact with the bracket 24 (FIG. 2). A further advantage of the beaded edges 44 of the panels 21, 22 is that they facilitate the attachment of an adjustable fairlead bracket 45 (FIG. 12) through which the cable may be passed and thereby more closely guided.

For purposes of rewinding cable onto the reel the spring motor 32 constructed in accordance with the present invention is mounted on one external end 26 of the shaft and is fixed between the shaft and the frame. This spring motor 32 is of unique construction in that it is located ouside of the frame panels and incorporates serially connected spring cartridges adapted for easy installation and replacement. Thus the size of the motor may be increased or decreased at will, and damaged or broken spring cartridges can be easily replaced without disassembling the entire reel.

The motor is made up of a series of spring cartridges, two of which are shown in the drawings. Each cartridge comprises a spiral spring 50 (FIGS. 2–5) formed of flat strip spring steel and secured to a hub 51 having a hexagonal socket 52 extending therethrough. The hub itself is formed of a pair of spaced plates 54, 55 joined together in spaced apart relation by three equally spaced pins 56. The spring 50 is secured at its inner end to one of the pins 56 and is wrapped around the hub in a spiral like manner and terminates in a loop 58 attachable to the cartridge housing or spider 60.

The spider comprises a pair of spaced arm or bracket plates 61, 62 having central apertures 63 therethrough in which the hub 51 is journaled. The brackets 61, 62 are joined at their outer ends by a pair of U-shaped tie plates 64 having spaced ears 64a spot welded between the plates 61, 62 and holding them in spaced apart relation (FIG. 5). The motor spring is fixed at one end to the hub which is rotatable in the spider plates 61, 62 and is fixed at its other end to the spider by means of a pin 65 fixed between the plates 61 and 62. The pin 65 lies within the U defined by the adjacent tie plate 64, and the end of the spring 50 is curled outwardly and wrapped around the pin. The spider includes a pair of U-shaped brackets 67, 68 extending transversely to the spider plates 61, 62 and fixed thereto adjacent the hub opening 63. These supports 67, 68 may be formed either of one piece or of two pieces welded together as shown in the drawings. The plates 61, 62, the tie plates 64, and the brackets 67, 68 confine the spring and form therewith a strong, compact easily handled spring motor cartridge. As the cable is withdrawn and the hub is rotated, the spring is wound within the spider to provide a potential driving force for later rewinding the cable.

Means are provided on the spider for engaging the adjacent panel 22 of the frame and thereby fixing the spider against rotation. One illustrative means comprises a pair of spaced projections 70 on one spider arm 61. These projections engage in corresponding apertures 71 in the frame panel 22 thereby fixing the spider with respect to the frame. The spider is desirably fixed in place to the frame or the adapter to prevent it from coming loose. Accordingly, there is provided a slot 72 at each end thereof for receiving a screw 73 or other fastener (FIG. 2).

In order to join two or more of the spring motor cartridges in series, there is provided between the cartridges an adapter or series spring coupler 74 having a pair of spaced apertures 75 for receiving the projections 70 on the spider of the second motor. The coupler 74 is connected to the first spring motor by means of a hexagonal drive collar 76 insertable in and engageable with the hexagonal hub 52 on the first motor. This collar 76 is hollow for rotatably receiving the reel shaft 26.

Figure 6:
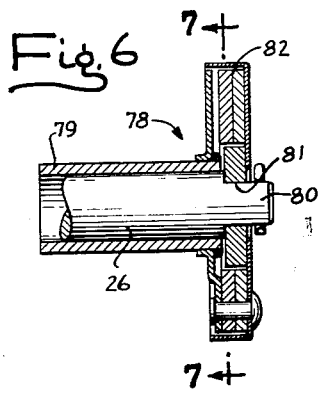
FIG. 6 is an enlarged section view taken substantially in the plane of line 6—6 of FIG. 2 and showing the over-run clutch.
Figure 7:
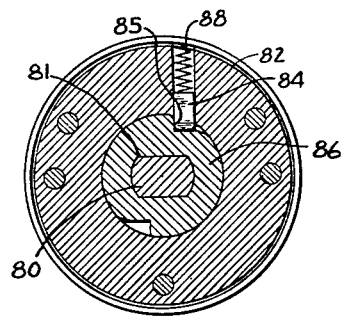
FIG. 7 is a section view taken substantially in the plane of line 7—7 of FIG. 6.

Means are also provided for connecting the spring motor to the reel shaft 25. To this end there is provided an over-running clutch 78 (FIGS. 6 and 7) for positive one way force transmission thereby preventing damage to the spring motor should the reel continue to rotate when the spring motor is completely unwound. In the present instance, the clutch 78 is provided with a drive sleeve 79 engageable in the hexagonal bore 52 of the last spring motor cartridge hub 51. The shaft 26 extends through the sleeve 79 and it is provided with a non-circular end 80, in this case having opposed flats, and engageable in a correspondingly shaped aperture 81 in the clutch. Positive one way force transmission is accomplished by means of an annular member 82 fixed to the drive sleeve 79 and connected through a one way clutch mechanism including a key 84 abutting a shoulder 85 on a drive collar 86 through which the non-circular aperture 81 extends. Referring to FIGS. 1, 2, and 7, as cable is pulled from the take-up reel, the reel 29 turns in a clockwise direction as viewed from its right-hand end. To rewind the cable, the cartridge spring motor 32 turns the reel 29 in a counterclockwise direction as viewed from its right-hand end. More specifically, rotation of the spring driven annular clutch member 82 in a counterclockwise direction, as shown in FIG. 7, will drive the collar 86 in the same direction. On the other hand, rotation of the reel 29 and thus of the collar 86 in the same direction (counterclockwise as shown in FIG. 7) after the springs are completely unwound will cause the key 84 to slip out of the notch defined by the shoulder 85 and allow the clutch collar 86 to rotate freely and relative to the annular member 82. With such arrangement, as cable is withdrawn from the reel 29, the reel and the reel shaft 26 rotate in a clockwise direction (as shown in FIGS. 2, 6 and 7). This clockwise rotation of the reel 29 and thereby the clutch collar 86, will drive the annular clutch member 82 through the key 84 which engages in the notch defined by the shoulder 85. The clutch member 82 in turn drives the sleeve 79 and spring cartridge hub 51 in a clockwise direction, thereby winding the spring 50 (FIG. 2). When the cable is released, the cartridge spring motor will act, through the spring cartridge hub 51, drive sleeve 79 and clutch 78, to drive the reel 29 in a counterclockwise direction (referring to FIG. 7) to rewind the cable.

In the overrunning clutch shown in FIGS. 6 and 7, the key 84 drivingly engages in the notch defined by the shoulder 85 to provide a one-way driving connection between the springs and the reel. Should the cable unexpectedly break or be severed while it is withdrawn, the motor will rotate the reel to wind the cable. In such a case there will be no restraining force on the cable and the reel will gain kinetic energy as it rotates and will continue to rotate after the springs are completely unwound. In this event, the shaft 26 and clutch collar 86 will continue to turn counterclockwise relative to the annular clutch member 82, which by virture of the resistance to further rotation of the spring will remain stationary. To this end, the key 84 will cam out of the notch defined by the shoulder 85 and move away from the shoulder, riding upon the periphery of the clutch collar 86 and permitting free relative rotation between the latter and the clutch member 82. The key 84 is urged into notch adjacent the shoulder 85 by a suitable spring 88. It is possible, of course, to reverse the direction of action of the key 84 to provide an over running clutch for the opposite direction of rotation.

To facilitate the assembly of the collector, the reel and the motor cartridges on the frame, the reel shaft is stepped so that the diameter of the portion 26 is less than the diameter of the main portion 25 which is in turn less than the diameter of the collector ring portion 27, as described above. This leaves the ends of the shaft projecting out from each of the frame panels for the mounting of the collector ring unit 34 and the spring cartridges making up the spring rewind motor without disturbing the drum 29 or the cable it carries. As shown in the drawings, the motor is mounted on the projecting small end portion 26 and the collector ring assembly on the projecting large end portion 27. The intermediate and large diameter shaft portions 25 and 27 are hollow for the passage of the conduit therethrough to the collector assembly. To this end, the shaft is provided with a bore 90 extending from one end approximately halfway through and opening into the shaft portion 25. The shaft itself is journaled in the panels by suitable bearings 91, 92, appropriate bearing supporting collars 93, 94, being provided on the shaft.

In order to effect automatic locking of the reel against rewinding when a desired amount of cable has been run out, there is provided a releasable locking device 96 on the reel cooperable with a suitable stop 97 on the frame 21. This locking device can be of the common window shade variety, or can be any other suitable type. Such devices are releasable in response to a short pull on the unwound cable and thereupon permit the entire length of cable to be automatically rewound under the action of the spring motor 32.

For purposes of connecting the cable contained on the reel or winding drum 29 to a power source, the collector assembly 34 (FIGS. 1 and 8-10) includes a number of collector rings 100 mounted to rotate with the shaft and reel, and a corresponding number of brush assemblies 101 mounted on the frame and engaging the collector rings 100. While any suitable collector ring assembly can be used, one improved ring and brush mechanism which can be easily expanded to accommodate a desired number of conductors is shown in the drawings.

For electrically connecting the conductors of the cable to a power source there is mounted in threaded engagement with the end of the shaft 27 terminal block 102, which may be of molded phenolic or other suitable material, including connector means for receiving the cable conductors, as well as means for sealing the cable conductors in the shaft. The terminal block also includes means for mounting protective caps when an explosion proof housing is required. The terminal block is generally annular in shape and is provided with an inner threaded bore 104 engageable with threads 105 on the end of the shaft. To preclude relative rotation between the terminal block 102 and the shaft 27 a set screw 106 is desirably provided.

The various collector rings 100 are supported around the shaft and insulated from each other and from the shaft by barrier rings 108, which are generally annular in shape and fit snugly around the shaft 27. For mounting the collector rings 100, the barrier rings 108 are provided with peripheral shoulders 109, and the collector rings 100 are isolated from each other by radially extending annular barriers 110. Thus when a plurality of barrier rings and collector rings are mounted on the shaft, three results a plurality of radial grooves each having a collector ring. This assembly is held tightly together for rotation with the shaft by the terminal block which is screwed tightly against it and forces the last ring against a shoulder 111 on the shaft.

For purposes of connecting each collector ring to the desired cable conductor, the collector rings include an inwardly extending lug 112 engageable with a conductor blade 113 which extends through appropriate apertures 114 in the barrier rings into engagement with a terminal 115 on the terminal block. The cable is connected to the terminal by means of a suitable connector 116 on its exposed end.

Figure 8:
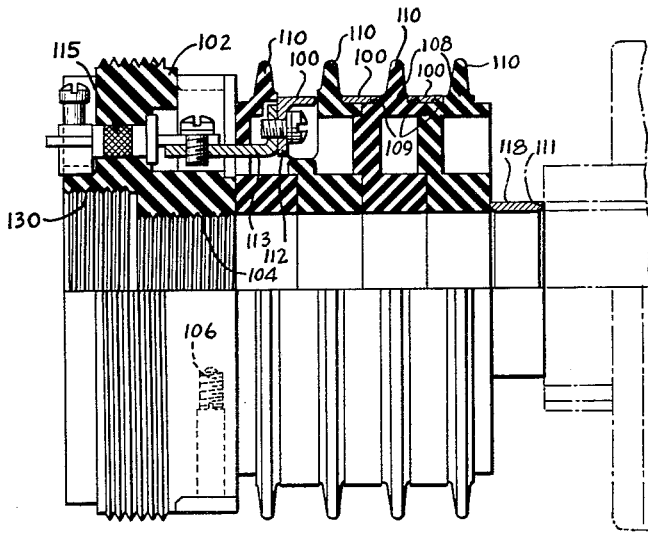
FIG. 8 is an enlarged fragmentary elevation view, partly in section, of the collection ring assembly shown in FIG. 1, but modified to show a spacer in place of one collector ring and one annular barrier.

Inasmuch as it may be desirable to use less than the total possible number of collector rings, appropriate spacers 118 can be mounted on the shaft in the place of a barrier and collector ring (FIG. 8). If at a future time it is desired to add collector rings to accommodate more cable conductors the spacers are easily replaced by barrier rings and collector rings.

Figure 9:
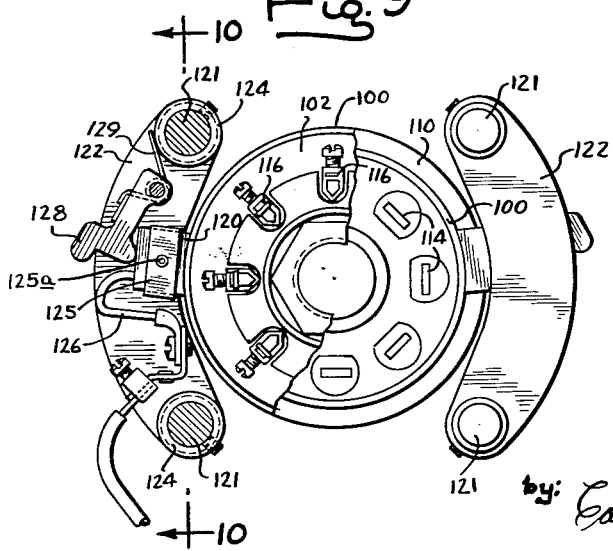
FIG. 9 is an enlarged section view taken substantially in the plane of line 9—9 of FIG. 1 and showing the collection ring and brush assembly.
Figure 10:
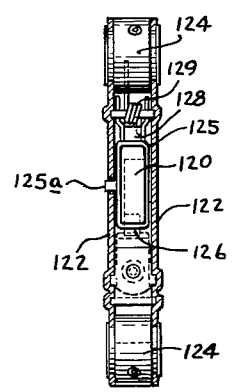
FIG. 10 is a section view taken substantially in the plane of line 10—10 of FIG. 9 and showing the brush assembly in detail.

For contacting each collector ring and connecting it to the appropriate power source the brush assembly 101 includes an individual brush 120 engaging each corresponding collector ring 100 (FIGS. 9 and 10). The brush assembly 101 in this case is mounted on the frame panel 21 by a pair of pins 121 tightly threaded in the frame. Each brush assembly comprises a pair of spaced arcuate frame plates 122 held in spaced apart relation on the pins 121 by insulated sleeve spacers 124. Pivotally mounted between the arcuate frame plates 126 is a self alining brush holder 125 guiding the brush 120 against its corresponding collector ring 100. To this end, the brush holder is formed with stamped projections or trunnions 125a pivotally received in corresponding apertures in the frame plates 122. With a mounting of this character, the full face of the brush 120 will be presented against a collector ring 100, thereby assuring complete electrical contact and even wear of the brushes. This mounting obviates many difficult alinement problems and even allows for some eccentricity in the collector rings. The brush 120 is connected to a power source conductor by means of a terminal 126. Suitable means are provided for urging the brush into contact with the collector ring, one illustrative means for example comprising a brush pressure finger 128 pivotally mounted on a frame plate 122 and urged against the brush by a spring 129. The brush assemblies are also mounted so that additional assemblies may be added or substituted as desired in accordance with the addition or removal of various collector rings.

To render the collector ring assembly waterproof against entrance of moisture through the hollow shaft, the terminal block is provided with a radially enlarged bore 130 threaded for engagement with a plug 131 and appropriate annular sealing gasket 132 which sealingly surrounds and is compressed against the cable (FIG. 1).

In accordance with another aspect of the invention, the above described take-up reel is made explosion proof by enclosing the rotary collector ring and brush assembly with a heavy walled explosion chamber. Because explosive fluids will tend to filter into the collector ring chamber, this chamber must be sure as to contain and extinguish any sparks and flames which may occur in it, and also withstand the pressure created by such explosives. On the exterior, the entire collector ring assembly is completely enclosed by a heavy walled metal cap 134 threadably engaged with an annular collar 135 projecting from the frame panel 21.

At the point where the cable and individual conductors emerge from the hollow shaft 27, and are engaged with the terminals 115, the explosion chamber is effectively sealed by a heavy walled inner cap 133 having internal threads engaged with external threads on the terminal block 102. The block 102, as pointed out above, is threaded onto the end of the shaft 27 and is thereby sealed thereon in explosion proof relation.

The explosion containing chamber is sealed at the point where the shaft 27 is journaled in the frame 21 by the use of two closely juxtaposed longitudinally extending surfaces, thereby completely sealing the chamber surrounding the collector ring assembly against the escape of sparks or flame. To this end, there is provided an annular bearing member or sleeve 160 having a radially extending flange 161 threaded for sealing engagement in a threaded socket 162 in the frame 21 and closely surrounding an enlarged portion 164 of the shaft 27. The internal surface 165 of the sleeve and the external shaft portion 164 are machined to close tolerances and are coextensive over a sufficient length (about 1½″) so that the passage of flame between them is prevented. The sleeve bearing portion 160 when threaded into the frame serves additionally as a seat for the outer race of the bearing 92. With the caps 133 and 134 tightly threaded in place, the collector ring and brush units are enclosed in a heavy walled chamber and any sparks or flames ignited therein are completely isolated from the surrounding atmosphere, and extinguished.

For connecting the brushes to a power supply (not shown) provision is made for the passage of an inlet cable (not shown) into the collector ring housing. To this end there is provided an explosion proof terminal or junction box 136 mounted on the frame of the machine and communicating through a passage 137 with the interior of the explosion proof chamber. When the lead in wires are in place in the passage, a suitable sealing cement is poured into the passage around the wire and allowed to set.

Figure 11:
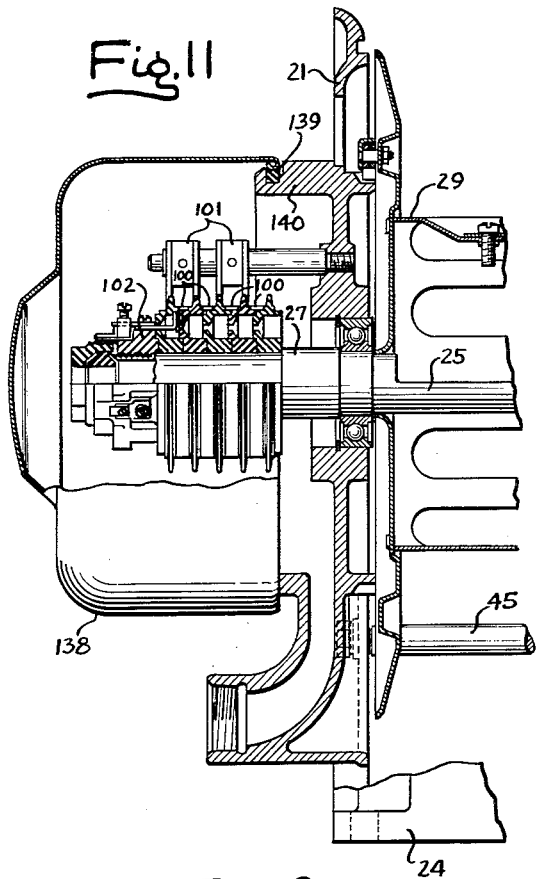
FIG. 11 is a partial view of a modified form of take-up reel illustrating a weather-proof construction therefor.

There is shown in FIG. 11 a modified form of collector ring assembly which affords suitable protection against atmospheric elements but is not explosion proof. In this modification, a sheet metal cap 138 is snapped in place over a square cut ring seal 139, or an O-ring seal, on an annular flange 140 extending from the frame panel 21. This cap serves to exclude dirt and moisture from the collector ring assembly. Additionally, the inner cap sealing the terminals of the terminal block is dispensed with and reliance is placed on the sealing gasket for excluding any dirt and moisture which might pass through the hollow shaft. In other respects, the construction of the collector ring assembly and brushes is substantially the same as described above.

While the above described take-up reel was powered directly by the spring motors mounted on the extension 26 of the shafts 25, in some instances it is desirable to increase the capacity of the reel. This can be done by employing a gear connection between the reel 29 and the spring motor 32 (FIGS. 12 and 13). In this modification, the shaft extension 26 is provided with a pinion gear 141 meshing with a spur gear 142 fixed on a motor shaft 143 and journaled on the frame panel 22 by a suitable bearing 144. In other respects the construction of the spring motor 32 is substantially the same.

It will be appreciated that any combination of the gear driven, weather proof and explosion proof reels may be made up. This, it will be recognized by those skilled in the art, is an important feature of the present invention in that the take-up reel embodying the spring motor structure, the expandable collector ring structure and the weather proof and explosion proof caps can be combined to form a take-up reel of the desired characteristics. The fact that the spring motor cartridges are mounted externally or outboard of the frame allows them to be serially stacked in any number to provide the necessary driving force. Furthermore, these cartridges are economical, disposable and thus are well adapted for easy installation and replacement.

I claim as my invention:

1. A take up reel comprising, in combination, a pair of generally circular frame side panels rigidly joined together in spaced relation by a transverse mounting bracket, a shaft extending through each of said panels and journaled for rotation therein, a drum fixed on said shaft intermediate said panels, a removable spring cartridge rewind motor outboard of one frame panel comprising a spider, a hub rotatably mounted in said spider, a rewind spring within said spider surrounding said hub and secured between said hub and said spider, means for removably securing said spider to said one panel, a drive sleeve rotatably journaled on said shaft and positively engaged with said hub and means for releasably securing said drive sleeve to said shaft whereby said spring motor can be removed from said take-up reel without disturbing the drum and shaft.

2. A take-up reel for storing and paying out an electrical cable including a plurality of conductors comprising, in combination, first and second generally circular frame side panels rigidly joined together in spaced relation by a transverse mounting bracket, a shaft extending through each of said panels, and journaled for rotation therein, a cable reel fixed on said shaft intermediate said panels and carrying the cable, a collector ring assembly fixed on one end of said shaft outboard of said first panel and electrically connected to the cable conductors, a brush assembly mounted on said first panel cooperating with said collector ring assembly and electrically connected to a power supply, a removable spring cartridge rewind motor outboard of said second panel comprising a spider, a hub rotatably mounted in said spider, a rewind spring within said spider surrounding said hub, means securing said spring at one end to said spider, means securing the other end of said spring to said hub, means for removably securing said spider to said second panel, a drive sleeve rotatably journaled on said shaft and positively engaged by said hub and means for removably securing said drive sleeve to said shaft.

3. A take-up reel for storing and paying out an electrical cable including a plurality of conductors comprising, in combination, first and second generally circular frame side panels rigidly joined together in spaced relation by a transverse mounting bracket, a shaft extending through each of said panels, and journaled for rotation therein, a cable reel fixed on said shaft intermediate said panels and carrying the cable, a collector ring assembly on one end of said shaft outboard of said first panel and electrically connected to the cable conductors, a brush assembly mounted on said first panel cooperating with said collector ring assembly and electrically connected to a power supply, first and second removable spring rewind motor cartridges outboard of said second panel, each cartridge comprising a spider, a hub rotatably mounted in said spider, a rewind spring within said spider surrounding said hub, and secured between said hub and said spider, means for removably securing the first cartridge spider to said second panel, means for removably securing the second cartridge hub to said shaft, and means engageable between the first cartridge hub and the second cartridge spider for joining said cartridges in series thereby increasing the length of cable which said rewind motor can take up.

4. In a take-up reel including a shaft journaled in a frame and mounting a drum carrying a cable or the like, a unitary spring rewind motor cartridge comprising, in combination, a spider, means on said spider for releasably engaging said frame, a hub rotatably mounted in said spider, a rewind spring within said spider surrounding said hub, means securing one end of said spring to said spider, and means securing the other end of said spring to said hub so that said spring, hub and spider are mountable as a cartridge on said frame, a drive sleeve rotatably journaled on said shaft and positively engaged with said hub, and an overrunning clutch means for drivingly connecting said drive sleeve to said shaft whereby when said cartridge and clutch are mounted in place said spring is wound in said spider as the drum is rotated by unreeling the cable therefrom for subsequently rotating the shaft and the drum to rewind the cable.

5. A take-up reel for storing and paying out an electrical cable having a plurality of conductors comprising, in combination, first and second generally circular frame side panels rigidly joined together in spaced relation by a transverse mounting bracket, a stepped shaft extending through each of said panels and journaled for rotation therein and having a large diameter hollow portion outboard of said first panel, an intermediate portion having an opening into said hollow portion extending between said panels, and a smaller diameter portion outboard of said second panel, a cable reel fixed on said intermediate shaft portion between said panels and carrying the cable with one end of said cable passing through said opening and said hollow portion, a collector ring assembly fixed on one end of said shaft outboard of said first panel and including a plurality of collector rings disposed between radially outwardly extending annular spacers and electrically connected to the cable conductors, a brush assembly mounted on said first panel and including a plurality of brushes cooperating with respective ends of said collector rings and electrically connected to a power supply, said brush assembly further including brush holders pivotally mounted for swinging movement relative to said collector rings for supporting said brushes in full contact with said rings, a spring cartridge rewind motor removably mounted outboard of said second panel and fixed to said second panel, and an overrunning clutch fixed between said motor and said other shaft end, whereby rotation of said reel resulting from a withdrawal of cable therefrom rotates the stepped shaft to wind the spring motor so that the cable can be subsequently rewound and to rotate the collector rings so that the cable is continuously connected to the power supply.

6. A take-up reel for storing and paying out an electrical cable including a plurality of conductors comprising, in combination, first and second frame side panels rigidly joined together in spaced relation by a transverse mounting bracket, a shaft extending through each of said panels and journaled for rotation therein, a cable reel fixed on said shaft intermediate said panels and carrying the cable, a removable spring rewind motor cartridge outboard of said first panel, said cartridge including a spider and a hub rotatably mounted in said spider and a rewind spring within said spider surrounding said hub, said cartridge also including means for securing said rewind spring to said spider and to said hub, a drive sleeve rotatably journaled on said shaft and positively engaged with said hub, means for releasably securing said drive sleeve to said shaft, a collector ring assembly including a terminal block threaded onto one end of said shaft outboard of said second panel and a plurality of collector rings fixed on one end of said shaft between said second panel and the terminal block, said shaft end being hollow for passing one end of the cable to the terminal block to which the conductors are connected, a brush assembly mounted on said second panel cooperating with said collector ring conductors, means on said terminal block for sealing the cable in said hollow shaft against the entrance of moisture, a heavy walled explosion-proof cap threaded onto said terminal block, a heavy walled explosion-proof cap threadably secured to said second frame panel and surrounding said collector ring assembly and said terminal block cap, and a sleeve-like bearing member threadably mounted on said second panel and surrounding said shaft in explosion-proof relation whereby an explosion-proof and weather-proof housing is defined enclosing the collector ring assembly and the brush assembly.

7. A take-up reel for storing and paying out an electrical cable comprising, in combination, first and second frame side panels rigidly joined together in spaced relation by a transverse mounting bracket, a shaft extending through each of said panels and journaled for rotation therein, a cable reel fixed on said shaft intermediate said panels and carrying the cable, a collector ring assembly fixed on one end of said shaft outboard of said first panel, said one shaft end being hollow for passing one end of the cable to the collector ring assembly, means for releasably sealing the cable in said hollow shaft, a brush assembly mounted on said first panel cooperating with said collector ring assembly and electrically connected to a power supply, a spring rewind motor cartridge removably mounted outboard of said second panel and including a spider and a hub rotatably mounted in said spider and a rewind spring within said spider surrounding said hub, said cartridge also including means for securing said spring to said spider and to said hub, a drive sleeve rotatably journaled on said shaft and positively engaged with said hub, means for securing said drive sleeve to said shaft, means sealing the cable in said hollow shaft against the passage of moisture, means sealingly engaging said first panel and surrounding said collector ring assembly protectively enclosing the same, and means sealingly engaging said second panel and surrounding said rewind motor protectively enclosing the same.

8. A take-up reel comprising, in combination, a pair of generally circular frame side panels rigidly joined together in spaced relation by a transverse mounting bracket, a shaft extending through each of said panels and journaled for rotation therein, a drum fixed on said shaft intermediate said panels, a removable spring cartridge rewind motor outboard of one frame panel comprising a spider, a hub rotatably mounted in said spider, a rewind spring within said spider surrounding said hub and secured between said hub and said spider, means for removably securing said spider to said one panel, a drive sleeve rotatably journaled on said shaft and positively but releasably engaged with said hub, and an overrunning clutch connection between said drive sleeve and said shaft, said clutch connection being constructed and arranged to effect positive coupling of said shaft and said drive sleeve to wind said spring as said drum is rotated by unreeling the cable therefrom and to effect free running of said shaft with respect to said drive sleeve upon relative movement therebetween incident to rotation of said drum in the opposite direction.

9 A take-up reel comprising, in combination, a pair of generally circular frame side panels rigidly joined together in spaced relation by a transverse mounting bracket, a shaft extending through each of said panels and journaled for rotation therein, a drum fixed on said shaft intermediate said panels, first and second removable spring rewind motor cartridges outboard of one frame panel, each said cartridge comprising a spider together with a hub rotatably mounted in said spider and a rewind spring within said spider surrounding said hub and secured between said hub and said spider, means for removably securing the spider of said first cartridge to said one panel, means for drivingly connecting the hub of said first cartridge with the spider of said second cartridge, an overrrunning clutch releasably secured to the hub of said second cartridge and connected with said shaft, said clutch being constructed and arranged to effect positive coupling of said shaft and said hub of said second cartridge to wind said springs as said drum is rotated by unreeling the cable therefrom and to effect free running of said shaft with respect to said second cartridge hub upon relative movement therebetween incident to rotation of said drum in the opposite direction.

References Cited in the file of this patent
UNITED STATES PATENTS

| | | |
|---|---|---|
| 296,738 | Fawkes | Apr. 15, 1884 |
| 790,940 | Wass et al. | May 30, 1905 |
| 815,830 | Hopkins | Mar. 20, 1906 |
| 846,778 | Christman | Mar. 12, 1907 |
| 1,037,466 | Gardner | Sept. 3, 1912 |
| 1,171,386 | Crutchley | Feb. 8, 1916 |
| 1,235,092 | Atkinson et al. | July 31, 1917 |
| 1,445,217 | Johnson | Feb. 13, 1923 |
| 1,476,941 | Young et al. | Dec. 11, 1923 |
| 1,551,206 | Newman | Aug. 25, 1925 |
| 1,630,952 | Leschman | May 31, 1927 |
| 1,747,411 | Anderson | Feb. 18, 1930 |
| 1,754,072 | Watts | Apr. 8, 1930 |
| 2,074,305 | Tornblom | Mar. 16, 1937 |
| 2,135,739 | Todd | Nov. 8, 1938 |
| 2,274,330 | Hammond | Feb. 24, 1942 |
| 2,391,141 | Dour et al. | Dec. 18, 1945 |
| 2,453,407 | Burns | Nov. 9, 1948 |
| 2,505,920 | Sporket | May 2, 1950 |
| 2,559,264 | Stevens | July 3, 1951 |
| 2,659,454 | Bandli | Nov. 17, 1953 |